United States Patent
Hristova et al.

(10) Patent No.: US 12,135,743 B2
(45) Date of Patent: Nov. 5, 2024

(54) SYSTEMS AND METHODS FOR DETECTING MISMATCHED CONTENT

(71) Applicant: Spotify AB, Stockholm (SE)

(72) Inventors: Desi Hristova, London (GB); Brian Regan, London (GB); Nicola Montecchio, Berlin (DE)

(73) Assignee: Spotify AB, Stockholm (SE)

( * ) Notice: Subject to any disclaimer, the term of this patent is extended or adjusted under 35 U.S.C. 154(b) by 16 days.

(21) Appl. No.: 18/048,383

(22) Filed: Oct. 20, 2022

(65) Prior Publication Data

US 2024/0134907 A1  Apr. 25, 2024
US 2024/0232257 A9  Jul. 11, 2024

(51) Int. Cl.
*G06F 16/65* (2019.01)
*G06F 16/64* (2019.01)
*G06F 16/683* (2019.01)

(52) U.S. Cl.
CPC .............. *G06F 16/65* (2019.01); *G06F 16/64* (2019.01); *G06F 16/683* (2019.01)

(58) Field of Classification Search
None
See application file for complete search history.

(56) References Cited

U.S. PATENT DOCUMENTS

| | | | | |
|---|---|---|---|---|
| 10,222,942 | B1* | 3/2019 | Zeiler | G06N 5/022 |
| 2010/0082615 | A1* | 4/2010 | Clinchant | G06F 16/58 |
| | | | | 707/E17.046 |
| 2012/0191357 | A1* | 7/2012 | Qiu | G16B 40/30 |
| | | | | 702/19 |
| 2013/0332400 | A1* | 12/2013 | Gonzalez | G06N 7/01 |
| | | | | 706/46 |
| 2014/0140625 | A1* | 5/2014 | Zhang | G06V 20/30 |
| | | | | 382/195 |

(Continued)

OTHER PUBLICATIONS

B. Whitman, G. Flake and S. Lawrence, Artist detection in music with Minnowmatch, Neural Networks for Signal Processing XI: Proceedings of the 2001 IEEE Signal Processing Society Workshop (IEEE Cat. No. 01TH8584), 2001, pp. 559-568, doi: 10.1109/NNSP.2001.943160.

(Continued)

*Primary Examiner* — Uyen T Le
(74) *Attorney, Agent, or Firm* — Morgan, Lewis & Bockius LLP

(57) ABSTRACT

An electronic device obtains a plurality of media items, including, for each media item in the plurality, a set of attributes of the media item. The device provides the set of attributes for each media item of the plurality of media items to a machine learning model that is trained to determine a pairwise similarity between respective media items in the plurality of media items and generates an acyclic graph of an output of the machine learning model that is trained to determine pairwise similarity distances between respective media items in the plurality of media items. The device clusters nodes of the acyclic graph, each node corresponding to a media item. Based on the clustering, the electronic device modifies metadata associated with a first media item in a first cluster and displays a representation of the first media item in a user interface according to the modified metadata.

20 Claims, 9 Drawing Sheets

(56) References Cited

U.S. PATENT DOCUMENTS

| | | | |
|---|---|---|---|
| 2016/0042252 A1* | 2/2016 | Sawhney | G06F 16/5838 |
| | | | 382/190 |
| 2016/0299906 A1* | 10/2016 | Cartoon | G06F 16/4387 |
| 2017/0004198 A1* | 1/2017 | Zholudev | G06F 16/382 |
| 2017/0076753 A1 | 3/2017 | Vouin et al. | |
| 2020/0125981 A1 | 4/2020 | González | |
| 2022/0284284 A1* | 9/2022 | Vartakavi | G06F 16/65 |

OTHER PUBLICATIONS

Royo-Hennequin et al., Disambiguating Music Artists at Scale with Audio Metric Learning, 19th International Society for Music Information Retrieval Conference, Paris, France, 2018.

\* cited by examiner

500

502 Obtain a plurality of media items, including, for each media item in the plurality of media items, a set of features of the media item.

> 504 The set of features includes one or more of: audio signals, language signals, label/licensor/feed features, and artist name similarities.

> 506 The plurality of media items correspond to a plurality of albums.

508 Provide the set of features for each media item of the plurality of media items to a machine learning model that is trained to determine a pairwise similarity between respective media items in the plurality of media items.

510 Generate an acyclic graph of an output of the machine learning model that is trained to determine pairwise similarity distances between respective media items in the plurality of media items.

> 512 Generating the acyclic graph comprises generating a minimum spanning tree.

514 Cluster nodes of the acyclic graph, each node corresponding to a media item.

516 Clustering the nodes of the acyclic graph includes generating a plurality of distinct clusters, a first respective cluster of the plurality of distinct clusters including a media content item that does not satisfy a threshold similarity distance relative to a media content item in a second respective cluster of the plurality of distinct clusters.

517 Generating the plurality of distinct clusters includes assigning the first media item to the first cluster, and modifying metadata associated with the first media item based on the clustering includes modifying the metadata to include information associated with the first cluster.

518 Respective media content items that have a respective pairwise similarity distance that satisfies the threshold similarity distance are grouped into a same respective cluster.

520 The first respective cluster represents a first artist and the second respective cluster represents a second artist.

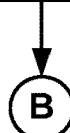

FIG. 5B

522 Based on the clustering: modify metadata associated with a first media item in a first cluster; and display a representation of the first media item in a user interface according to the modified metadata.

524 Displaying the representation of the first media item in a user interface according to the modified metadata includes displaying the first media item in an artist page, wherein the respective artist is identified by the modified metadata.

526 Receive a search request from a user, the search request indicating metadata; and in response to the search request, display the representation of the first media item in accordance a determination that the modified metadata satisfies the search request.

528 Generate recommendations based on the modified metadata.

530 Concurrently display the representation of the first media item and a representation of a third media item in the user interface, wherein the third media item is associated with metadata that matches the modified metadata.

532 In accordance with a determination that two or more media content items have a similarity distance indicating that the two or more media content items correspond to a same media content item, remove at least one of the two or more media content items from display in the user interface.

534 Display a link to a user interface that represents the first cluster.

FIG. 5C

SYSTEMS AND METHODS FOR DETECTING MISMATCHED CONTENT

TECHNICAL FIELD

The disclosed embodiments relate generally to media provider systems, and, in particular, to detecting mismatched content items in a catalog of content items provided by the media provider.

BACKGROUND

Recent years have shown a remarkable growth in consumption of digital goods such as digital music, movies, books, and podcasts, among many others. The overwhelmingly large number of these goods often makes navigation and discovery of new digital goods an extremely difficult task. To cope with the constantly growing complexity of navigating the large number of goods, users are typically able to discover and navigate to sets of content items using search queries and/or by viewing pages of related content, such as artist information pages that include content associated with the particular artist. For these reasons, it is important that metadata for such media items be accurate. For example, when two artists with similar names are assigned the same artist identifier, when an album by one artist is mistakenly assigned an artist identifier for an artist with a similar name, or when an a same artist is assigned two different artist identifiers, the content associated with the artist is said to be mismatched.

SUMMARY

A media content provider stores metadata associated with content items, including artist names. However, the problem of content mismatch arises, e.g., when artists are not properly credited for their albums. When this happens, albums appear on the wrong artist page and artist links lead to the incorrect artist. There are other, more pernicious types of content mismatch. Consider an artist who has two artist pages, with their music split between them rather than all appearing in a single place. Or, consider an artist profile for "Artist A feat. Artist B." This artist page should not exist; rather, the corresponding tracks should be credited to both Artist A and Artist B. The embodiments described herein aim to detect content mismatch.

In the disclosed embodiments, systems and methods are provided for building a model that computes an acyclic graph, e.g., a minimum spanning tree, across albums to detect large jumps in dissimilarity (referred to below as pairwise similarity distance) between albums (or other media items), and separates albums into clusters where a jump in pairwise similarity distance is greater than a threshold amount. The inputs to the model include, in various embodiments, audio signals, language signals, label/licensor/feed, track and album artist name similarities. The media content provider uses the pairwise similarity distances between respective media items to identify one or more media items that are likely to be mismatched, or misattributed, based on their dissimilarity.

To that end, in accordance with some embodiments, a method is provided. The method includes obtaining a plurality of media items, including, for each media item in the plurality of media items, a set of attributes of the media item. The method includes providing the set of attributes for each media item of the plurality of media items to a machine learning model that is trained to determine a pairwise similarity between respective media items in the plurality of media items. The method further includes generating an acyclic graph of an output of the machine learning model that is trained to determine pairwise similarity distances between respective media items in the plurality of media items and clustering nodes of the acyclic graph, each node corresponding to a media item. The method includes, based on the clustering, modifying metadata associated with a first media item in a first cluster and displaying a representation of the first media item in a user interface according to the modified metadata.

In accordance with some embodiments, an electronic device is provided. The electronic device includes one or more processors and memory storing one or more programs. The one or more programs include instructions for performing any of the methods described herein.

In accordance with some embodiments, a non-transitory computer-readable storage medium is provided. The non-transitory computer-readable storage medium stores one or more programs for execution by an electronic device with one or more processors. The one or more programs comprising instructions for performing any of the methods described herein.

Thus, systems are provided with improved methods for detecting, and updating metadata for, mismatched content.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 5A-5C are flow diagrams illustrating a method of modifying metadata based on clusters representing similar media items, in accordance with some embodiments.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
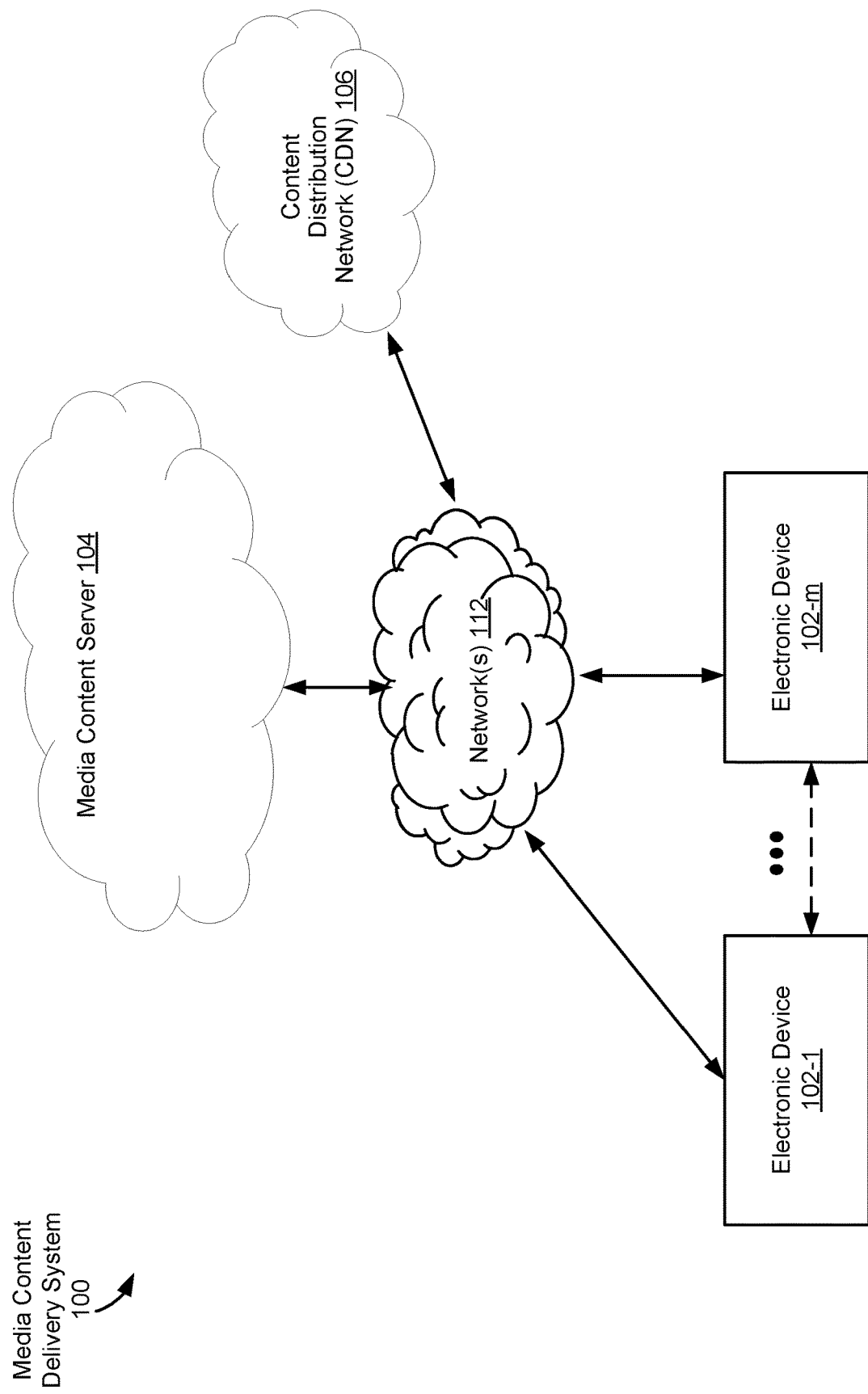
FIG. 1 is a block diagram illustrating a media content delivery system, in accordance with some embodiments.

FIG. 1 is a block diagram illustrating a media content delivery system 100, in accordance with some embodiments. The media content delivery system 100 includes one or more electronic devices 102 (e.g., electronic device 102-1 to electronic device 102-$m$, where m is an integer greater than one), one or more media content servers 104, and/or one or more content distribution networks (CDNs) 106. The one or more media content servers 104 are associated with (e.g., at least partially compose) a media-providing service. The one or more CDNs 106 store and/or provide one or more content items (e.g., to electronic devices 102). In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, an infotainment system, digital media player, a speaker, television (TV), and/or any other electronic device capable of presenting media content (e.g., controlling playback of media items, such as music tracks, podcasts, videos, etc.). Electronic devices 102 may connect to each other wirelessly and/or through a wired connection (e.g., directly through an interface, such as an HDMI interface). In some embodiments, electronic devices 102-1 and 102-$m$ are the same type of device (e.g., electronic device 102-1 and electronic device 102-$m$ are both speakers). Alternatively, electronic device 102-1 and electronic device 102-$m$ include two or more different types of devices.

In some embodiments, electronic devices 102-1 and 102-$m$ send and receive media-control information through network(s) 112. For example, electronic devices 102-1 and 102-$m$ send media control requests (e.g., requests to play music, podcasts, movies, videos, or other media items, or playlists thereof) to media content server 104 through network(s) 112. Additionally, electronic devices 102-1 and 102-$m$, in some embodiments, also send indications of media content items to media content server 104 through network(s) 112. In some embodiments, the media content items are uploaded to electronic devices 102-1 and 102-$m$ before the electronic devices forward the media content items to media content server 104.

In some embodiments, electronic device 102-1 communicates directly with electronic device 102-$m$ (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-$m$. In some embodiments, electronic device 102-1 communicates with electronic device 102-$m$ through network(s) 112. In some embodiments, electronic device 102-1 uses the direct connection with electronic device 102-$m$ to stream content (e.g., data for media items) for playback on the electronic device 102-$m$.

In some embodiments, electronic device 102-1 and/or electronic device 102-$m$ include a media application 222 (FIG. 2) that allows a respective user of the respective electronic device to upload (e.g., to media content server 104), browse, request (e.g., for playback at the electronic device 102), and/or present media content (e.g., control playback of music tracks, playlists, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). The electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, audiobooks, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 includes a voice API, a connect API, and/or key service. In some embodiments, media content server 104 validates (e.g., using key service) electronic devices 102 by exchanging one or more keys (e.g., tokens) with electronic device(s) 102.

In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
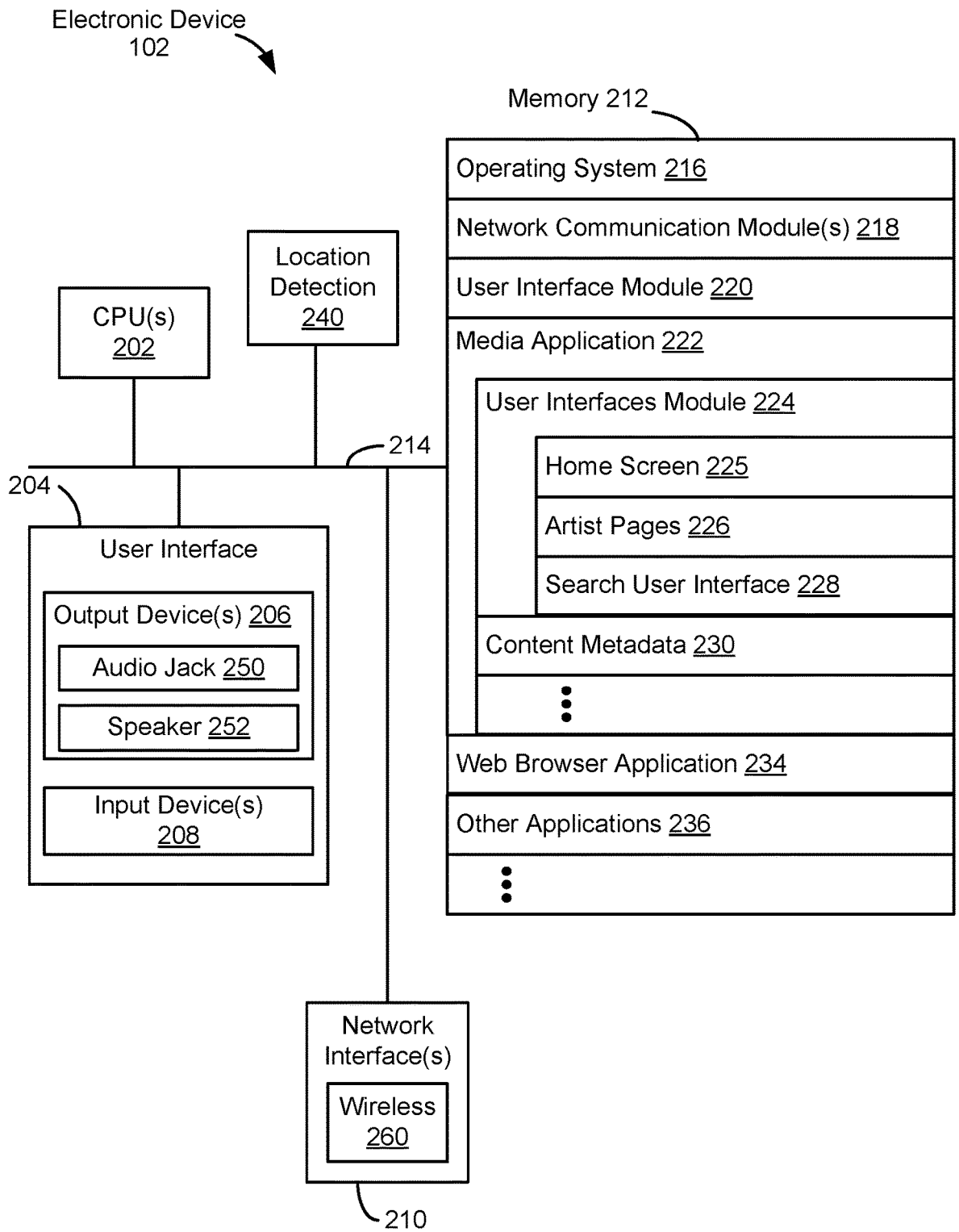
FIG. 2 is a block diagram illustrating an electronic device, in accordance with some embodiments.

FIG. 2 is a block diagram illustrating an electronic device 102 (e.g., electronic device 102-1 and/or electronic device 102-*m*, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone and voice recognition device to supplement or replace the keyboard. Optionally, the electronic device 102 includes an audio input device (e.g., a microphone) to capture audio (e.g., speech from a user).

Optionally, the electronic device 102 includes a location-detection device 240, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, media presentations systems, and/or or other wireless (e.g., Bluetooth-compatible) devices (e.g., for streaming audio data to the media presentations system of an automobile). Furthermore, in some embodiments, the wireless interface 260 (or a different communications interface of the one or more network interfaces 210) enables data communications with other WLAN-compatible devices (e.g., a media presentations system) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

- an operating system 216 that includes procedures for handling various basic system services and for performing hardware-dependent tasks;
- network communication module(s) 218 for connecting the client device 102 to other computing devices (e.g., media presentation system(s), media content server 104, and/or other client devices) via the one or more network interface(s) 210 (wired or wireless) connected to one or more network(s) 112;
- a user interface module 220 that receives commands and/or inputs from a user via the user interface 204 (e.g., from the input devices 208) and provides outputs for playback and/or display on the user interface 204 (e.g., the output devices 206);

a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data. In some embodiments, media application 222 also includes the following modules (or sets of instructions), or a subset or superset thereof:

an user interfaces module 224 for displaying a plurality of user interfaces of the media application 222. For example, the In some embodiments, the user interface module includes:

a home screen 225 for displaying a shelf that includes representations of playlists, albums, tracks, podcasts, audiobooks, or other media content for the user. In some embodiments, the home screen 225 displays personalized content that is recommended to the user;

artist pages 226 for displaying information related to an artist in the artist page (e.g., in response to selection of the artist, such as user selection of a link to the artist page), such as albums, track titles, biographic information, or other artist information;

a search user interface 228 for displaying a user interface for browsing, searching for, and/or selecting media items from search results, including audio items such as podcasts and songs, for playback and/or for forwarding requests for media content items to the media content server;

a content metadata module 230 for storing and/or displaying metadata relating to the media items, including a genre, an artist, and/or an album associated with the respective media items;

a web browser application 234 for accessing, viewing, and interacting with web sites; and other applications 236, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
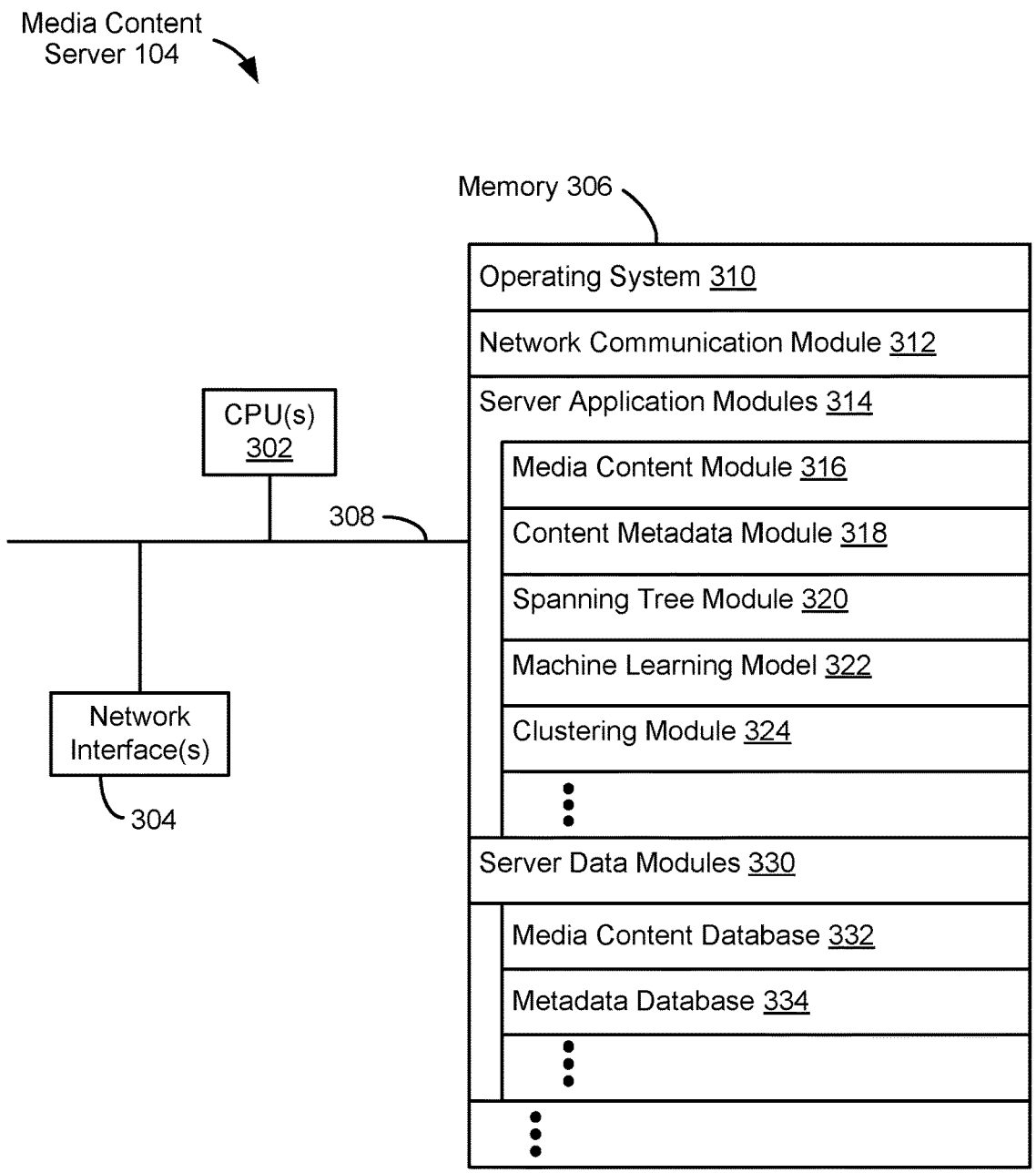
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

an operating system 310 that includes procedures for handling various basic system services and for performing hardware-dependent tasks;

a network communication module 312 that is used for connecting the media content server 104 to other computing devices via one or more network interfaces 304 (wired or wireless) connected to one or more networks 112;

one or more server application modules 314 for performing various functions with respect to providing and managing a content service, the server application modules 314 including, but not limited to, one or more of:

a media content module 316 for storing one or more media content items and/or sending (e.g., streaming), to the electronic device, one or more requested media content item(s);

a content metadata module 318 for storing and/or providing (e.g., streaming) metadata associated with respective content items to the electronic device;

a spanning tree module 320 for generating a spanning tree, or other acyclic graph, based on respective determined similarities of pairs of content items, wherein the respective similarities are optionally generated using machine learning model 322;

a machine learning model 322 for determining similarities between pairs media items, wherein the similarity output from the machine learning model is used by spanning tree module 320 to generate the acyclic graph. In some embodiments, machine learning model 322 is trained (e.g., using supervised learning) and/or stored at another electronic device;

a clustering module 324 for clustering one or more media items based on the acyclic graph and/or based on the similarity distances (e.g., determined by machine learning model 322) between pairs of respective media items;

one or more server data module(s) 330 for handling the storage of and/or access to media items and/or metadata relating to the media items; in some embodiments, the one or more server data module(s) 330 include:

a media content database 332 for storing media items; and a metadata database 334 for storing metadata relating to the media items, including a genre, an artist, and/or an album associated with the respective media items.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Figure 4A:
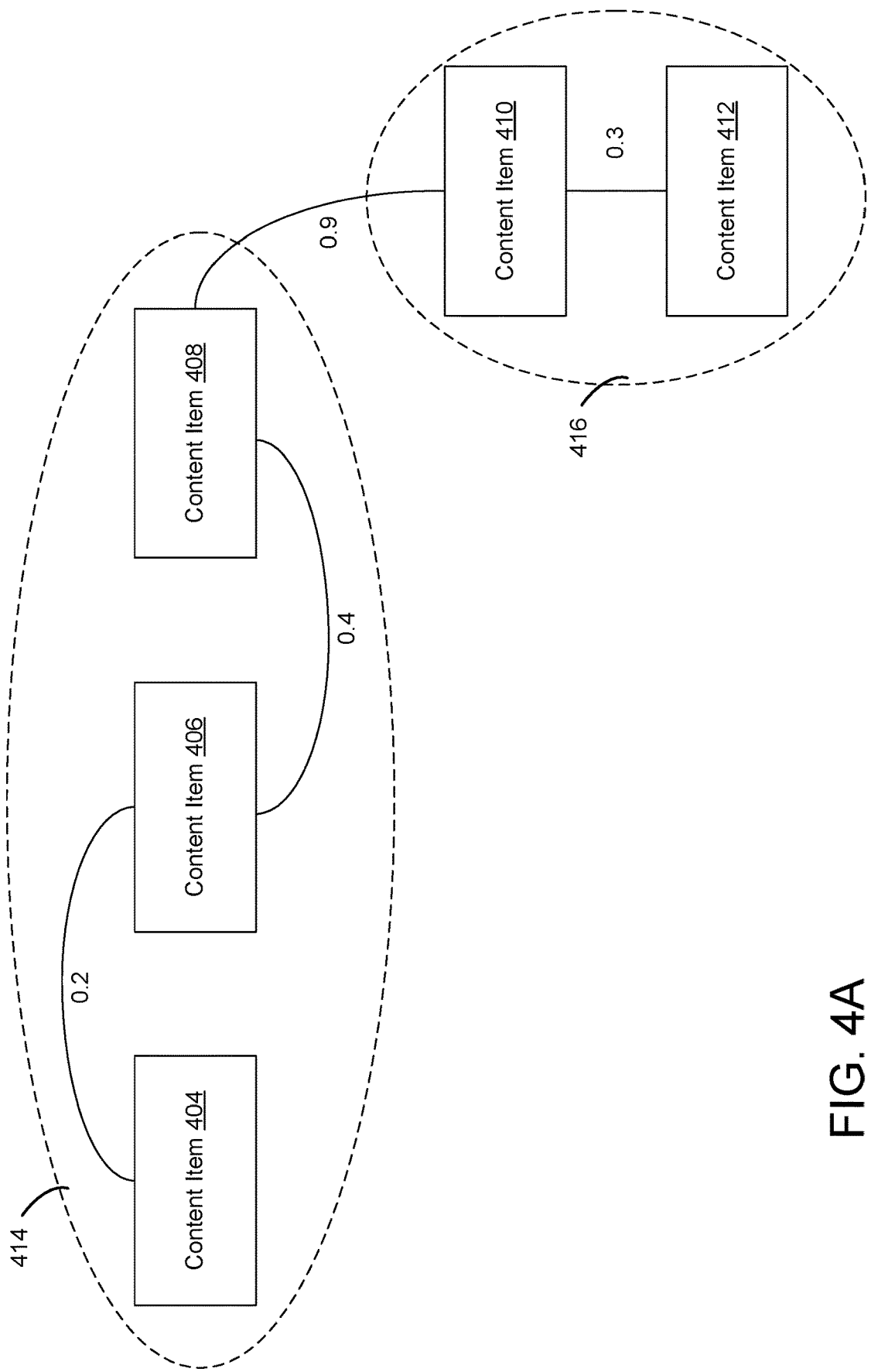
FIG. 4A is a block diagram illustrating determining clusters of media content items based on pairwise similarity distances, in accordance with some embodiments.

FIG. 4A illustrates a minimum spanning tree that is generated (e.g., found) using the outputs of a machine learning algorithm, in accordance with some embodiments. The minimum spanning tree includes nodes, which represent content items (tracks, albums, etc.) and edges, which represent pairwise similarity distances between content items. In some embodiments, the machine learning algorithm produces pairwise similarity distances for a large number of edges connecting content items, thus creating an initial graph, and those edges are pruned (e.g., using a separate algorithm for generating an acyclic graph using the outputs of the machine learning algorithm) to generate the minimum spanning tree from the initial graph. In some embodiments, the machine learning algorithm is trained using supervised learning (e.g., with labels attached to the inputs indicating the similarity of the inputs).

In some embodiments, each content item corresponds to an album (e.g., or a song, a podcast, or a video). In some embodiments, each content item in the set of content items is stored in a catalog (e.g., library) of the media content provider. In some embodiments, the catalog is stored at a database associated with the media content provider, such that a user is enabled to request a media item from the catalog to playback (e.g., by streaming and/or locally downloading the media item at a media presentation device of the user). In some embodiments, each content item is associated with metadata, for example, content 404 is an album and the metadata includes an artist associated with the album. In some embodiments, the metadata associated with each content item is stored in association with the content item in the catalog.

In some embodiments, the media-providing service further provides an application (e.g., a mobile application, a desktop application, and/or a web application) for a user device (e.g., a mobile device, a media presentation device, or another device in communication with a media presentation device) that includes a user interface (e.g., provided via user interfaces module 224) for browsing the catalog. In some embodiments, representations of one or more media items are displayed on a home user interface (e.g., home screen 225) for the user, wherein the user is enabled to navigate to other user interfaces and/or select a media item to playback from the home user interface. For example, the application includes a search user interface (e.g., search user interface 228) for searching for media content and a playback user interface that is displayed while a respective media item is playing back. In some embodiments, the application includes an artist page user interface (e.g., selected from artist pages 226) for browsing content associated with a respective artist. For example, the artist page user interface includes indications of media content that are associated with metadata that includes an artist identifier for the artist.

In some embodiments, in order to generate pairwise similarity distances, the media-providing service determines a set of attributes for each media item in a plurality of media items selected from the catalog. In some embodiments, the set of attributes for each media item include audio signals of the content item in additional to one or more signals determined from the metadata. In some embodiments, the plurality of media items is a subset, less than all, of the media items in the catalog. In some embodiments, the plurality of media items are identified according to an artist name associated with the plurality of media items. For example, the plurality of media items are included on a same artist page associated with an artist identifier. In some embodiments, the plurality of media items are selected in accordance with a determination that the respective media item is included on at least one of a plurality of artist pages (e.g., similar artist pages). For example, the media-providing service determines that two or more artists are likely to be confused (or content may be misattributed to the artist) based on two or more artists having similar names or identifiers (e.g., "Artist one" versus "Artist 1"), such as a similar sound of the artist names, a similar spelling of the artist names, and/or the artist name being combined with one or more other artist names (e.g., "Artist A featuring Artist 1"). In some embodiments, the plurality of media items are randomly selected from the catalog. In some embodiments, the plurality of media items are selected based on a feature of the media items that is similar across the media items (e.g., a same genre, a same album name, etc.).

In some embodiments, each of the plurality of media items is associated with a plurality of attributes. In some embodiments, one or more attributes of the plurality of attributes are provided as inputs to a machine learning algorithm. For example, the machine learning algorithm takes one or more of: audio signals (e.g., audio features representing how the media item sounds, such as a tempo, a rhythm, a mood, etc.), language signals (e.g., what language(s) are present in the media item), a licensor identifier, attributes derived from album artwork associated with the media item, track and/or album titles, release dates, album types (e.g., single, album, EP), and whether the content item is a remix. In some embodiments, the plurality of attributes include one or more features that provide similarity information between two or more content items, such as label/licensor/feed features (e.g., features based on an exact match of the strings or ID of a label/licensor/feed field of two or more content items and/or based on string similarities of different tokenizations of these fields), artist name similarities (e.g., based on matching the strings or ID of the artist name for the content items), and album similarities (e.g., if two albums correspond to two releases of a same album and/or albums that are otherwise related) as inputs.

In some embodiments, the machine learning algorithm is trained (e.g., using supervised learning) to determine and output pairwise similarity distances (e.g., representing a level of similarity) between respective media items. For example, a similarity distance is calculated between a respective media item and each of the other respective media items by the machine learning algorithm. As such, using attributes of content items, the machine learning algorithm calculates pairwise similarity distances between the content items.

In some embodiments, using the pairwise similarity distances (e.g., the output of the machine learning algorithm) between pairs of content items, the system determines an acyclic graph (e.g., a minimum spanning tree), which includes one acyclic path through the set of content items (e.g., including content item 404, content item 406, content item 408, content item 410 and content item 412) that minimizes the overall distance of the path. For example, a minimum spanning tree, sometimes referred to as a minimum weight spanning tree, is a subset of the edges of a connected, edge-weighted undirected graph (e.g., the initial graph created using the outputs of the machine learning algorithm) that connects all the vertices together, without any cycles and with the minimum possible total edge weight. For example, the minimum spanning tree includes paths (e.g., acyclic paths) whereby each content item is connected to a backward and/or forward content item having the shortest overall (e.g., total) distance between the content items. In some embodiments, the distance between each pair of content items in the acyclic graph represents a similarity distance calculated (e.g., by the machine learning algorithm) between the content items. In some embodiments, the distance between each pair of content items corresponds to an inverse of a similarity value calculated by the machine learning algorithm (e.g., a greater distance between a respective pair of content items corresponds to a lesser degree of similarity (e.g., a smaller similarity value)). It will be understood that a person of ordinary skill in the art could use the outputs of the machine learning algorithm to obtain similarity distances between respective media items, wherein the acyclic graph is found by minimizing an overall distance across the content items.

In FIG. 4A, content item 404 and content item 406 have a pairwise similarity distance of 0.2, and content item 406 and content item 408 have a pairwise similarity distance of 0.4. In some embodiments, a pairwise similarity value of 1.0 (or another value close to 1.0, such as 0.9) represents that a pair of content items includes identical (e.g., repeat) content items (e.g., with a pairwise similarity distance that does not exist (e.g., has a distance of 0)). In some embodiments, in accordance with a determination that the two content items are identical (e.g., with a pairwise similarity value of 1.0), one (or both) of the content items is flagged or otherwise indicated as a repeat content item. In some embodiments, one of the content items is automatically, without additional user input, removed from the set of media content items. As such, the minimum spanning tree is used to deduplicate the set of media content items.

In some embodiments, the system determines one or more clusters based on the pairwise similarities (and/or based on the pairwise similarity distances) calculated for the pairs of content items that remain connected by edges after the minimum spanning tree has been calculated (e.g., the pairwise similarity distances used for clustering is only performed on the edges of the minimum spanning tree). For example, a pair of content items that have a similarity distance that satisfies a threshold similarity distance are assigned to a same cluster (e.g., the pairwise similarity distance is less than a threshold similarity distance). For example, in FIG. 4A, the threshold similarity distance is 0.7. Thus, content items 404, 406 and 408 are considered to be in a same first cluster because the pairwise similarity distance between content items 404 and 406 is less than the threshold similarity distance of 0.7, and the pairwise similarity distance between content items 406 and 408 is less than (e.g., satisfies) the threshold similarity distance of 0.7. Stated another way, the pairwise similarity value between content items 404 and 406 satisfy a threshold similarity value (e.g., that is inversely proportional to the similarity distance), and the pairwise similarity value between content items 406 and 408 satisfy the threshold similarity value.

In some embodiments, in accordance with a determination that a pairwise similarity distance for a pair of content items does not satisfy the threshold similarity distance (e.g., has a similarity distance of 0.7 or higher), such as content item 408 and content item 410 having a pairwise similarity distance of 0.9, the content items are separated into distinct clusters (e.g., content item 408 is grouped into cluster 414 and content item 410 is grouped into cluster 416).

In some embodiments, each cluster represents at least one piece of shared metadata of the content items within the cluster. For example, each cluster represents a distinct artist, wherein content items within the cluster are associated with the same artist.

Figure 4C:
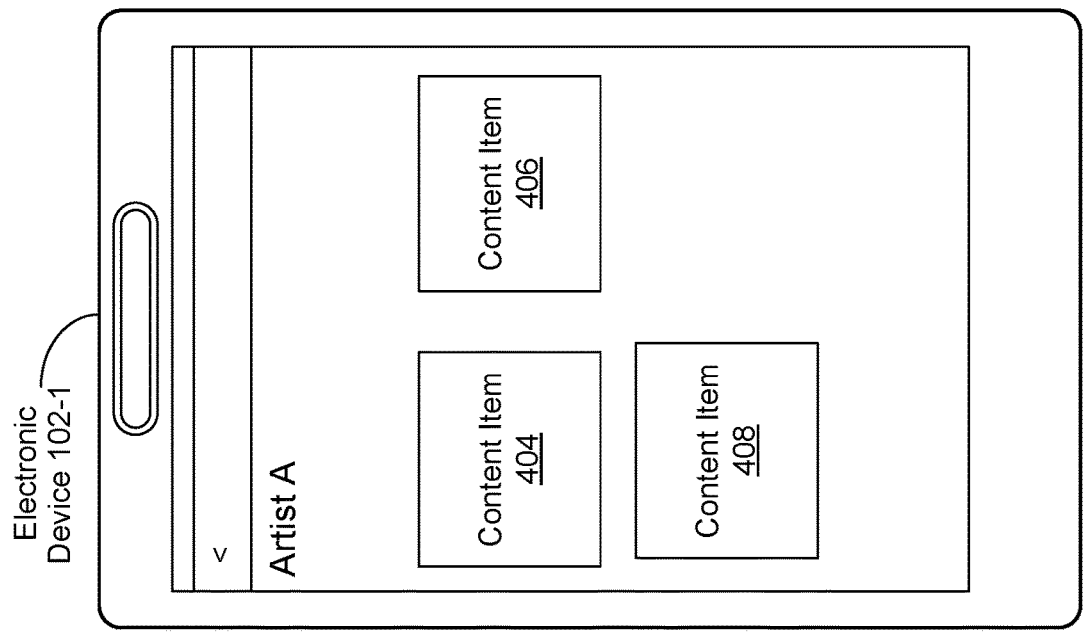
FIGS. 4B-4E are illustrations of user interfaces for displaying content items according to metadata, in accordance with some embodiments.
Figure 4B:
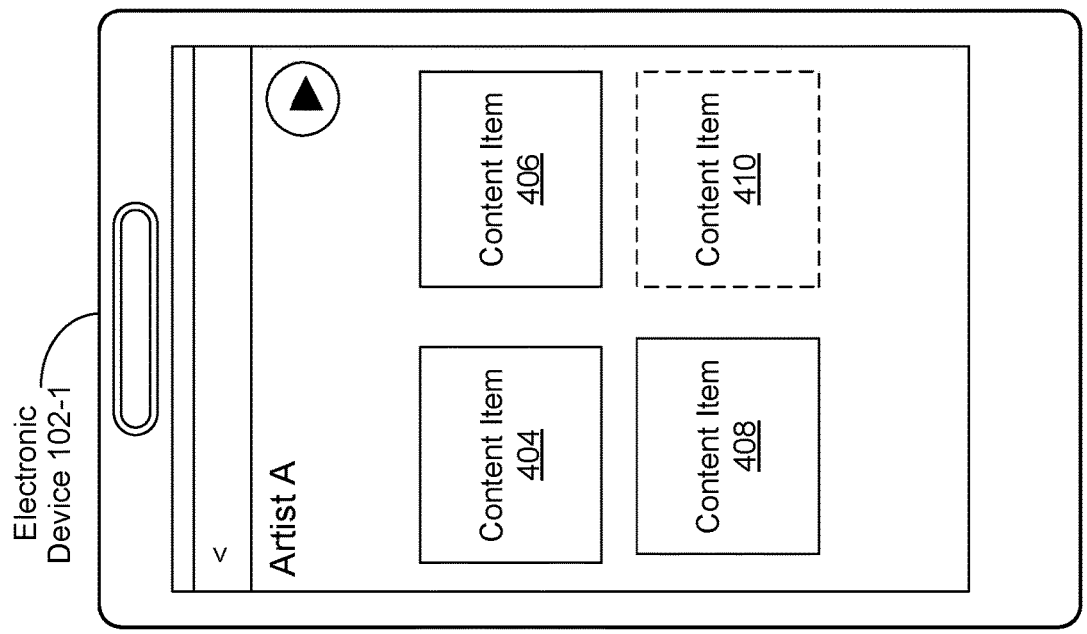

FIGS. 4B-4E are example user interfaces for displaying representations of content items on an electronic device 102-1. FIG. 4B illustrates a user interface of an artist page for Artist A. In some embodiments, the artist page includes representations of one or more content items associated with the respective artist. For example, based on metadata stored by the media providing service, content items 404, 406, 408 and 410 are attributed to Artist A, and thus representations of the content items are displayed on the artist page in FIG. 4B. In some embodiments, Artist A corresponds to cluster 414 (FIG. 4A). In some embodiments, the user interface illustrated in FIG. 4B includes mismatched and/or misattributed content item 410 (e.g., FIG. 4B illustrates a user interface that is displayed before executing the method described with reference to FIG. 4A (e.g., before content item 410 is identified as belonging to a different cluster).

For example, FIG. 4C illustrates that, in accordance with a determination that content item 410 belongs to a distinct cluster (e.g., cluster 416) that does not correspond to Artist A, the electronic device 102-1 forgoes displaying content item 410 on the artist page for Artist A (e.g., after the metadata for content item 410 has been updated, automatically or manually by a user). For example, content item 410 is grouped into cluster 416, which is distinct from cluster 414, as described with reference to FIG. 4A.

Figure 4E:
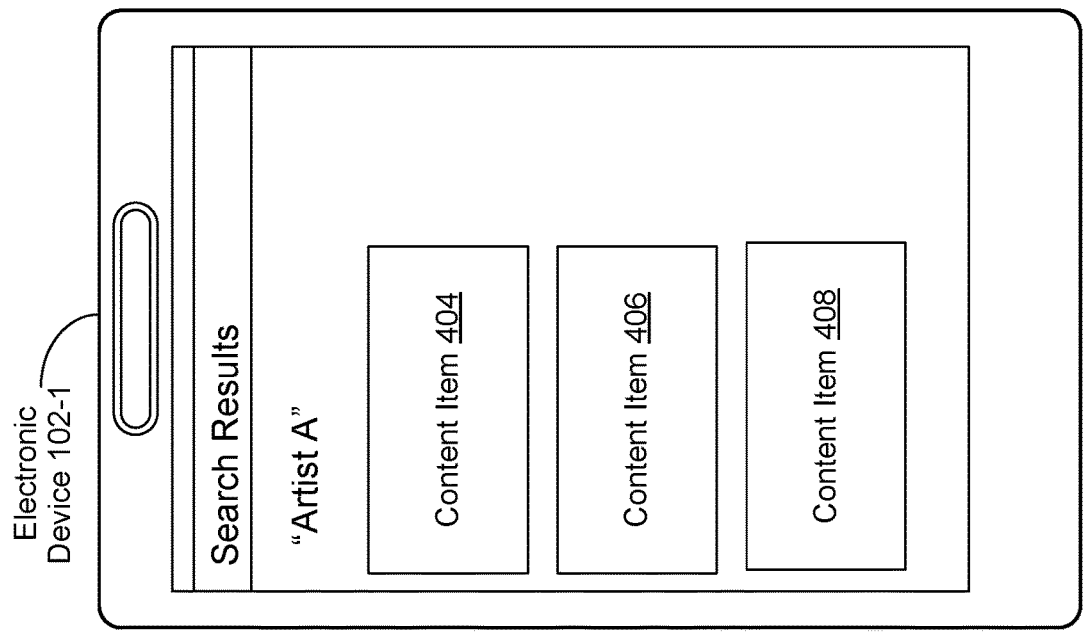
Figure 4D:
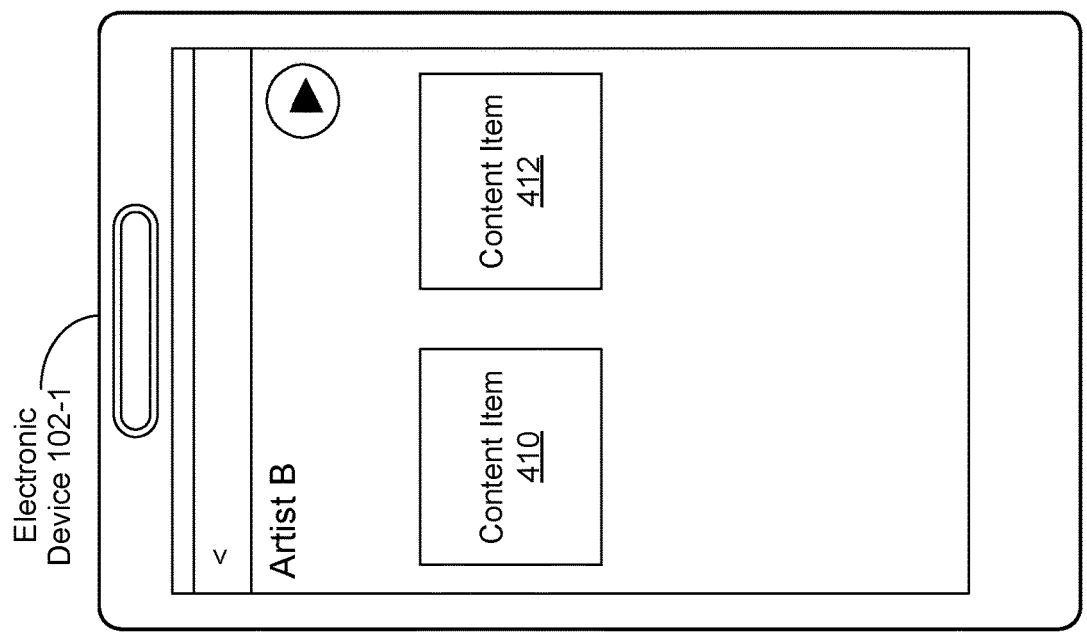

In some embodiments, as illustrated in FIG. 4D, content item 410 and content item 412 are grouped into cluster 416. In some embodiments, cluster 416 is associated with a distinct artist than cluster 414. For example, cluster 414 is associated with Artist A and cluster 416 is associated with Artist B. In some embodiments, an artist page for Artist B displays representations of the content items that are grouped in cluster 416. For example, representations of content item 410 and content item 412 are displayed in FIG. 4D on the artist page for Artist B. In some embodiments, the page for Artist B is a new page (e.g., created in accordance with cluster 416). In some embodiments, the page for Artist B is an existing page, wherein content item 410 and content item 412 are added to the existing page for Artist B.

In some embodiments, artist pages for respective artists (e.g., Artist A, Artist B) are updated in accordance with media items being grouped in clusters using the machine learning model described with reference to FIG. 4A. For example, as the machine learning model identifies content items that have been misattributed (e.g., as belonging to a different cluster (e.g., artist)), metadata for the content items that are misattributed is updated (e.g., automatically without user intervention, or by a user/administrator). For example, metadata for content item 410 is updated to associate content item 410 with artist B (corresponding to cluster 416) instead of artist A (corresponding to cluster 414).

In some embodiments, the metadata is stored (e.g., in a database of the media-providing service) that is accessed to generate the artist pages (and/or to generate search results and/or recommended playlists).

FIG. 4E illustrates a user interface that displays search results in response to a user request to search. For example, a user inputs a search query (e.g., "Artist A"). In some embodiments, the search query corresponds to a text input, a voice command, and/or a user input selecting a link (e.g., a link that includes an artist identifier, optionally displayed with a media content item). In some embodiments, search results for the search query are determined by performing a lookup of metadata. In some embodiments, the search results are generated by removing one or more content items that are duplicative of other content items that are included in the search results.

It will be understood that although the examples described herein refer to distinct clusters as representing distinct artists, it will be understood that other types of metadata may be associated with the clusters. For example, tracks in an album (e.g., where each cluster represents a distinct album). As another example, each cluster represents a genre.

FIGS. 5A-5C are flow diagrams illustrating a method 500 of modifying metadata based on clusters representing similar media items, for example, by determining misattribution of media content to an artist, in accordance with some embodiments. Method 500 may be performed at an electronic device (e.g., media content server 104 and/or electronic device(s) 102) having one or more processors and memory storing instructions for execution by the one or more processors. In some embodiments, the method 500 is performed by executing instructions stored in the memory (e.g., memory 212, FIG. 2, memory 306, FIG. 3) of the electronic device. In some embodiments, the method 500 is performed by a combination of the server system (e.g., including media content server 104 and CDN 106) and a client device.

Referring now to FIG. 5A, in performing the method 500, the electronic device obtains (502) a plurality of media items (e.g., a plurality of albums), including, for each media item in the plurality of media items, a set of attributes of the media item. For example, in FIG. 4A, the electronic device obtains content items 404, 406, 408, 410, and 412.

In some embodiments, the set of attributes includes (504) audio signals (similarity vectors), language signals, label/licensor/feed attributes, and artist name similarities (e.g., a similarity between an album artist name and a track artist name). For example, a set of features is obtained from the set of attributes, wherein the set of features are defined for a respective pair of content items (e.g., label similarity between the content items, artist name similarity between the content items, etc.).

In some embodiments, the plurality of media items correspond to (506) a plurality of albums. For example, content item 404 corresponds to a first album, and content item 406 corresponds to a second album. It will be understood that the plurality of media items may also correspond to a plurality of tracks, a plurality of podcasts, or a plurality of audiobooks.

The electronic device provides (508) the set of attributes for each media item of the plurality of media items to a machine learning model that is trained to determine a pairwise similarity between respective media items in the plurality of media items. For example, each content item is associated with one or more attributes, and a set of attributes of the one or more attributes are input to the machine learning model, which outputs similarity distances between respective media items based on the set of attributes.

The electronic device generates (510) an acyclic graph (e.g., illustrated in FIG. 4A) of an output of the machine learning model that is trained to determine pairwise similarity distances between respective media items in the plurality of media items. In some embodiments, the acyclic graph is found by minimizing an overall similarity distance of edges of the graph connecting all of the media items in the plurality of media items.

In some embodiments, generating the acyclic graph comprises (512) generating a minimum spanning tree. In some embodiments, generating the acyclic graph comprises using a graph-based clustering model.

The electronic device clusters (514) nodes of the acyclic graph, each node corresponding to a media item (e.g., and each edge between the nodes of the acyclic graph representing a similarity distance). For example, as described with reference to FIG. 4A, content items 404, 406 and 408 are grouped into cluster 414 and content items 410 and 412 are grouped into cluster 416.

In some embodiments, clustering the nodes of the acyclic graph includes (516) generating a plurality of distinct clusters (e.g., by determining that a pairwise similarity distance does not satisfy a threshold similarity distance and dividing the media items into clusters accordingly (e.g., assigning one media item to one cluster and the other media item to the other cluster)). A first respective cluster of the plurality of distinct clusters includes a media content item that does not satisfy a threshold similarity distance relative to a media content item in a second respective cluster of the plurality of distinct clusters (e.g., the similarity distance between the media content items exceeds a threshold similarity distance and thus does not satisfy the threshold similarity distance). For example, in accordance with a determination that a pairwise similarity distance between a first media item and a second media item does not satisfy a threshold similarity distance, the device assigns the first media item to the first cluster and assigns the second media item to the second cluster distinct from the first cluster. For example, the similarity distance between content item 408 and content item 410 does not satisfy (e.g., is greater than) a threshold similarity distance in FIG. 4A, and thus the content items are grouped into distinct clusters. Stated another way, the similarity distance between content item 408 and content item 410 is 0.9, which is greater than the threshold distance of 0.7 described above with reference to FIG. 4A.

In some embodiments, generating the plurality of distinct clusters includes (517) assigning the first media item to the first cluster, and modifying metadata associated with the first media item based on the clustering includes modifying the metadata to include information associated with the first cluster.

In some embodiments, respective media content items that have a respective pairwise similarity distance that satisfies (e.g., does not exceed) the threshold similarity distance are (518) grouped into a same respective cluster. For example, in accordance with a determination that a pairwise similarity distance between a first media item and a third media item satisfies a threshold similarity distance, the device assigns the first media item to the first cluster and assigns the third media item to the first cluster, thereby grouping the first media item and the third media item in the same cluster. For example, the similarity distance between content item 404 and 406 is 0.2 in FIG. 4A, which is less than a threshold similarity distance of 0.7, such that both content item 404 and content item 406 are grouped into cluster, indicating that the similarity distance between content item 404 and 406 satisfies the threshold similarity distance. For example, the electronic device deletes edges that do not satisfy the threshold similarity distance (e.g., 0.7) to generate a plurality of clusters, and respective media content items that have a respective pairwise similarity distance that satisfies the threshold similarity distance are grouped into a same respective cluster.

In some embodiments, the first respective cluster represents (520) a first artist (and the first media item is associated with the first artist) and the second respective cluster represents a second artist, and wherein the user interface is associated with the second artist. For example, in FIG. 4A, the cluster 414 includes albums that have metadata that corresponds to Artist A (e.g., associated with the artist page user interface illustrated in FIG. 4C), and cluster 416 includes albums that have metadata that corresponds to Artist B (e.g., associated with the artist page user interface illustrated in FIG. 4D).

Based on the clustering, the electronic device modifies (522) metadata associated with a first media item in a first cluster and displaying a representation of the first media item in a user interface according to the modified metadata. In some embodiments, the metadata is modified by the electronic device automatically without user intervention. In some embodiments, the metadata is modified in response to a user input corresponding to a request to modify the metadata. For example, the metadata of content item 410 that was previously associated with Artist A, is updated (FIG. 4B), based on the clusters, to associate content item 410 with Artist B, and content item 410 is thus removed from the page associated with Artist A and is displayed on the artist page associated with Artist B (e.g., FIG. 4D).

In some embodiments, displaying the representation of the first media item in a user interface according to the modified metadata includes (524) displaying the first media item in an artist page, wherein the respective artist is identified by the modified metadata. For example, FIGS. 4B-4C illustrate artist pages displayed in the user interface of the electronic device 102-1.

In some embodiments, the electronic device receives (526) a search request from a user, the search request indicating metadata, and, in response to the search request, displays the representation of the first media item in accordance with a determination that the modified metadata satisfies the search request. For example, the user interface is a search result user interface, as described with reference to FIG. 4E. In some embodiments, the search request is for an artist name, and the first media item is presented as being associated with the artist name in the search request.

In some embodiments, the electronic device generates (528) recommendations based on the modified metadata. For example, for an artist, the electronic device provides recommendations from the same artist (e.g., based at least in part on a playback history of the user indicating an interesting in the artist), wherein the recommendations are selected from the content items included in the cluster associated with the artist.

In some embodiments, the electronic device concurrently displays (530) the representation of the first media item and a representation of a second media item in the user interface, wherein the second media item is associated with metadata that matches the modified metadata (e.g., media items are clustered in accordance with their metadata and the media items in a same cluster are displayed together). For example, as described with reference to FIGS. 4B-4C, content items associated with cluster 414 correspond to Artist A and are displayed in an artist page for Artist A, while content items associated with cluster 416 correspond to Artist B and are displayed in an artist page for Artist B.

In some embodiments, in accordance with a determination that two or more media content items have a similarity distance indicating that the two or more media content items correspond to a same media content item (e.g., a similarity value of 1, or another number, and/or a similarity distance of 0), the electronic device removes (532) at least one of the two or more media content items from display in the user interface (e.g., to deduplicate media content items). For example, a similarity value of 1 output by the machine learning model indicates that two media items are actually a same media content item, and in response to determining that two media items are the same, one of the media items is removed from display on the artist page. As such, the system deduplicates entries in the catalog and forgoes displaying the duplicate entry in the user interface for the user. In some embodiments, deduplicating the entries is performed by the electronic device automatically, without user intervention. In some embodiments, deduplicating the entries is performed in response to a user input corresponding to a request to modify the metadata.

In some embodiments, the electronic device displays (534) a link to a user interface that represents the first cluster (e.g., a link to an artist page). For example, the application of the media-providing service includes a plurality of user interfaces. In some embodiments, while the user is browsing media content to playback via the media-providing service, the user interface displays a selectable link for navigating to page that includes metadata related to the link. For example, a link to an artist page is displayed next to an indication of an album (e.g., cover art of the album) and in response to a user input selecting the link, the artist page is displayed, including indications of other content items in the cluster associated with the artist (e.g., as illustrated in FIG. 4C, "Artist A"). In some embodiments, the link is displayed as an artist identifier (e.g., the user selects the artist identifier link to navigate to the artist page). In some embodiments, the link is a link to another user interface, for example, to provide additional information about the media item (e.g., in response to user selection of the indication of the album, indications of tracks included in the album are displayed).

Although FIGS. 5A-5C illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:
    at a first electronic device associated with a media-providing service, the first electronic device having one or more processors and memory storing instructions for execution by the one or more processors:
    obtaining a plurality of media items, including, for each media item in the plurality of media items, a set of attributes of the media item;
    displaying, in a user interface, a plurality of representations of the plurality of media items, including a first representation for a first media item, based on metadata associated with respective media items of the plurality of media items;
    providing the set of attributes for each media item of the plurality of media items to a machine learning model that is trained to determine a pairwise similarity distance between respective media items in the plurality of media items;
    generating an acyclic graph of an output of the machine learning model that is trained to determine pairwise similarity distances between respective media items in the plurality of media items;
    clustering nodes of the acyclic graph, each node corresponding to a media item; and
    based on the clustering:
        modifying metadata associated with the first media item in a first cluster; and
        updating display of the user interface to exclude display of the first representation of the first media item in the user interface according to the modified metadata.

2. The method of claim 1, wherein generating the acyclic graph comprises generating a minimum spanning tree.

3. The method of claim 1, wherein the set of attributes includes one or more of:
    audio signals, language signals, label/licensor/feed features, and artist name similarities.

4. The method of claim 1, including displaying the representation of the first media item in an artist page, wherein the respective artist associated with the artist page is identified by the modified metadata.

5. The method of claim 1, further comprising:
    receiving a search request from a user, the search request indicating metadata; and
    in response to the search request, displaying the representation of the first media item in accordance with a determination that the modified metadata satisfies the search request.

6. The method of claim 1, further comprising, generating recommendations based on the modified metadata.

7. The method of claim 1, further comprising, concurrently displaying the representation of the first media item and a representation of a second media item in the user interface, wherein the second media item is associated with metadata that matches the modified metadata.

8. The method of claim 1, wherein clustering the nodes of the acyclic graph includes generating a plurality of distinct clusters, a first respective cluster of the plurality of distinct clusters including a media content item that does not satisfy a threshold similarity distance relative to a media content item in a second respective cluster of the plurality of distinct clusters.

9. The method of claim 8, wherein generating the plurality of distinct clusters includes assigning the first media item to the first cluster, and modifying metadata associated with the first media item based on the clustering includes modifying the metadata to include information associated with the first cluster.

10. The method of claim 8, wherein respective media content items that have a respective pairwise similarity distance that satisfies the threshold similarity distance are grouped into a same respective cluster.

11. The method of claim 8, wherein the first respective cluster represents a first artist and the second respective cluster represents a second artist, and wherein the user interface is associated with the second artist.

12. The method of claim 1, further comprising, in accordance with a determination that two or more media content items have a similarity distance indicating that the two or more media content items correspond to a same media content item, removing at least one of the two or more media content items from display in the user interface.

13. The method of claim 1, wherein the plurality of media items correspond to a plurality of albums.

14. The method of claim 1, further comprising, displaying a link to a user interface that represents the first cluster.

15. A non-transitory computer-readable storage medium storing one or more programs for execution by an electronic device with one or more processors, the one or more programs comprising instructions for:
    obtaining a plurality of media items, including, for each media item in the plurality of media items, a set of attributes of the media item;
    displaying, in a user interface, a plurality of representations of the plurality of media items, including a first representation for a first media item, based on metadata associated with respective media items of the plurality of media items;
    providing the set of attributes for each media item of the plurality of media items to a machine learning model that is trained to determine a pairwise similarity distance between respective media items in the plurality of media items;
    generating an acyclic graph of an output of the machine learning model that is trained to determine pairwise similarity distances between respective media items in the plurality of media items;
    clustering nodes of the acyclic graph, each node corresponding to a media item; and
    based on the clustering:
        modifying metadata associated with the first media item in a first cluster; and
        updating display of the user interface to exclude display of the first representation of the first media item in the user interface according to the modified metadata.

16. An electronic device, comprising:
    one or more processors; and
    memory storing one or more programs, the one or more programs including instructions for:
        obtaining a plurality of media items, including, for each media item in the plurality of media items, a set of attributes of the media item;
        displaying, in a user interface, a plurality of representations of the plurality of media items, including a first representation for a first media item, based on metadata associated with respective media items of the plurality of media items;

providing the set of attributes for each media item of the plurality of media items to a machine learning model that is trained to determine a pairwise similarity distance between respective media items in the plurality of media items;

generating an acyclic graph of an output of the machine learning model that is trained to determine pairwise similarity distances between respective media items in the plurality of media items;

clustering nodes of the acyclic graph, each node corresponding to a media item; and based on the clustering:
- modifying metadata associated with the first media item in a first cluster; and
- updating display of the user interface to exclude display of the first representation of the first media item in the user interface according to the modified metadata.

17. The electronic device of claim 16, wherein clustering the nodes of the acyclic graph includes generating a plurality of distinct clusters, a first respective cluster of the plurality of distinct clusters including a media content item that does not satisfy a threshold similarity distance relative to a media content item in a second respective cluster of the plurality of distinct clusters.

18. The electronic device of claim 17, wherein generating the plurality of distinct clusters includes assigning the first media item to the first cluster, and modifying metadata associated with the first media item based on the clustering includes modifying the metadata to include information associated with the first cluster.

19. The electronic device of claim 17, wherein respective media content items that have a respective pairwise similarity distance that satisfies the threshold similarity distance are grouped into a same respective cluster.

20. The electronic device of claim 17, wherein the first respective cluster represents a first artist and the second respective cluster represents a second artist, and wherein the user interface is associated with the second artist.

* * * * *